United States Patent
Nakagawa et al.

(10) Patent No.: US 11,894,541 B2
(45) Date of Patent: Feb. 6, 2024

(54) ELECTRODE FOR LITHIUM ION SECONDARY BATTERY, AND LITHIUM ION SECONDARY BATTERY

(71) Applicant: HONDA MOTOR CO., LTD., Tokyo (JP)

(72) Inventors: Takashi Nakagawa, Saitama (JP); Kazuki Saimen, Saitama (JP); Takeshi Fujino, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 376 days.

(21) Appl. No.: 16/989,909

(22) Filed: Aug. 11, 2020

(65) Prior Publication Data

US 2021/0057713 A1    Feb. 25, 2021

(30) Foreign Application Priority Data

Aug. 20, 2019 (JP) .................. 2019-150543

(51) Int. Cl.
| | | |
|---|---|---|
| H01M 4/04 | (2006.01) | |
| H01M 4/525 | (2010.01) | |
| H01M 4/505 | (2010.01) | |
| H01M 4/58 | (2010.01) | |
| H01M 10/0525 | (2010.01) | |
| H01M 10/0562 | (2010.01) | |
| H01M 4/02 | (2006.01) | |

(52) U.S. Cl.
CPC ......... *H01M 4/0407* (2013.01); *H01M 4/505* (2013.01); *H01M 4/525* (2013.01); *H01M 4/58* (2013.01); *H01M 10/0525* (2013.01); *H01M 10/0562* (2013.01); *H01M 2004/021* (2013.01); *H01M 2004/027* (2013.01); *H01M 2004/028* (2013.01); *H01M 2300/0071* (2013.01)

(58) Field of Classification Search
CPC ........ H01M 4/0407; H01M 4/13; H01M 4/58; H01M 4/131; H01M 4/136; H01M 4/366; H01M 4/505; H01M 4/525; H01M 4/624; H01M 10/0562; H01M 2004/021; H01M 2004/027; H01M 2004/028; H01M 2300/0071

See application file for complete search history.

(56) References Cited

U.S. PATENT DOCUMENTS

| | | |
|---|---|---|
| 5,807,646 A | 9/1998 | Iwata et al. |
| 2015/0171478 A1 | 6/2015 | Suzuki et al. |
| 2017/0237121 A1 | 8/2017 | Oono et al. |
| 2017/0271717 A1* | 9/2017 | Yamashita ............ H01M 4/366 |
| 2017/0331146 A1 | 11/2017 | Haba et al. |
| 2020/0313161 A1* | 10/2020 | Isojima ............. H01M 10/0525 |

FOREIGN PATENT DOCUMENTS

| | | | |
|---|---|---|---|
| CN | 107086295 A | 8/2017 | |
| CN | 107112498 A | 8/2017 | |
| CN | 107204455 A | 9/2017 | |
| CN | 108808008 A | 11/2018 | |
| EP | 0728701 B1 * | 1/2000 | ............ C01G 45/00 |
| JP | 2007226969 A | 9/2007 | |
| JP | 2010003614 A | 1/2010 | |
| KR | 20180084236 A | 7/2018 | |

OTHER PUBLICATIONS

Han et al., "Electrochemical Stability of Li10GeP2S12 and Li7La3Zr2O12 Solid Electrolytes," Advanced Energy Materials, vol. 6, Issue 8. (Year: 2016).*
Fudong Han et al., "Electrochemical Stability of Li10GeP2S12 and Li7La3Zr2O12 Solid Electrolytes", <<Advanced Energy Materials>>, vol. 6, No. 8, pp. 1-8, Jan. 21, 2016.
Office Action issued in the CN Patent Application No. 202010841346.X, dated Sep. 29, 2023.

* cited by examiner

*Primary Examiner* — Allison Bourke
*Assistant Examiner* — Bethany C Bouchard
(74) *Attorney, Agent, or Firm* — CKC & Partners Co., LLC

(57) ABSTRACT

Provided are an electrode for a lithium ion secondary battery, and a lithium ion secondary battery, in which a reduction in the permeability of an electrolyte solution and an increase in resistance even when the density of the electrode is increased, can be suppressed.

In the electrode for a lithium ion secondary battery, a layer in which the diffusion rate of an electrolyte solution is greater than in an active material layer is disposed between a current collector and an active material layer.

Specifically, the electrode for a lithium ion secondary battery includes a current collector, and an electrode active material layer containing an electrode active material, the electrode active material layer being formed on at least one side of the current collector, in which an electroconductive layer containing solid electrolyte particles and electroconductive particles is disposed between the current collector and the electrode active material layer.

8 Claims, No Drawings

ELECTRODE FOR LITHIUM ION SECONDARY BATTERY, AND LITHIUM ION SECONDARY BATTERY

This application is based on and claims the benefit of priority from Japanese Patent Application No. 2019-150543, filed on 20 Aug. 2019, the content of which is incorporated herein by reference.

BACKGROUND OF THE INVENTION

Field of the Invention

The present invention relates to an electrode for a lithium ion secondary battery, and a lithium ion secondary battery including the electrode.

Related Art

Conventionally, lithium ion secondary batteries have been in widespread use as a secondary battery with high energy density.

Lithium ion secondary batteries employing a liquid as an electrolyte include a structure in which a separator is provided between a positive electrode and a negative electrode and the space between the positive electrode and the negative electrode is filled with a liquid electrolyte (electrolyte solution).

Since the electrolyte solution of such a lithium ion secondary battery is usually a flammable organic solvent, some lithium ion secondary batteries pose a problem in safety against heat, in particular.

Therefore, solid batteries employing a flame-retardant solid electrolyte as an alternative to the organic liquid electrolyte have also been proposed.

There are various demands on such lithium ion secondary batteries depending on the application.

For example, in the case where application to automobiles and the like is intended, batteries having not only high energy density but also less impaired output characteristics after repeated charge and discharge are desirable.

However, when the density of the electrode is increased for attaining the high energy density, the impregnation property of the electrolyte solution is reduced due to an increase in the packing factor of an active material. Thus, the following problems have occurred: an increase in the time required for the production of the electrode; and occurrence of a voltage variance during aging of the formed battery, resulting in a decrease in initial capacity and/or deterioration of the durability of the battery.

To address these problems, a current collector including a coating film on the surface thereof has been proposed (see Patent Document 1).

The current collector described in Patent Document 1 is an aluminum current collector including a coating film that contains a compound having ion permeability and carbon fine particles.

The current collector described in Patent Document 1 gives a lithium secondary battery allowing for quick charge and discharge, and having a high initial battery capacity maintenance rate at a high rate (high current value).

In addition, a current collector in which a polymer layer containing a carbon material is laminated on the surface thereof has also been proposed (see Patent Document 2). According to the current collector described in Patent Document 2, a lithium ion secondary battery including the current collector is suitable for an on-board battery and exhibits high performances (for example, stable high output).

Patent Document 1: Japanese Unexamined Patent Application, Publication No. 2007-226969

Patent Document 2: Japanese Unexamined Patent Application, Publication No. 2010-003614

SUMMARY OF THE INVENTION

However, the lithium ion secondary batteries including the current collectors described in Patent Documents 1 and 2 exhibit a lowered energy density of a cell due to an increase of the coating film formed on the current collector.

In particular, an object of the present invention is to provide an electrode for a lithium ion secondary battery and a lithium ion secondary battery, in which a reduction in the permeability of an electrolyte solution and an increase in resistance even when the density of the electrode is increased, can be suppressed.

The present inventors found that when an electrolyte salt is disposed in the vicinity of a current collector in an electrode for a lithium ion secondary battery, a fluoride-based coating film is formed on the surface of the current collector and thereby the formation of an oxide coating film on the current collector is suppressed.

Then, the present inventors considered that the disposition of a layer in which the diffusion rate of an electrolyte solution is greater than in an active material layer, between the current collector and the active material layer could suppress a reduction in the permeability of the electrolyte solution, to accomplish the present invention.

Specifically, an aspect of the present invention relates to an electrode for a lithium ion secondary battery, including a current collector, and an electrode active material layer containing an electrode active material, the electrode active material layer being formed on at least one side of the current collector, in which the electrode includes an electroconductive layer containing solid electrolyte particles and electroconductive particles, between the current collector and the electrode active material layer.

The particle diameter of the solid electrolyte particles may be smaller than the particle diameter of the electrode active material, and greater than the particle diameter of the electroconductive particles.

The solid electrolyte particles and the electroconductive particles may be complexed to form a solid electrolyte-electroconductive particle complex.

In the solid electrolyte-electroconductive particle complex, the electroconductive particles may be disposed on the surface of the solid electrolyte particles.

The solid electrolyte particles may be particles of an oxide solid electrolyte.

The oxide solid electrolyte may be at least one selected from the group consisting of $Li_7La_3Zr_2O_{12}$ (LLZO), $Li_{6.75}La_3Zr_{1.75}Ta_{0.25}O_{12}$ (LLZTO), $Li_{0.33}La_{0.56}TiO_3$ (LLTO), $Li_{1.3}Al_{0.3}Ti_{1.7}(PO_4)_3$ (LATP), and $Li_{1.6}Al_{0.6}Ge_{1.4}(PO_4)_3$ (LAGP).

The density of the electrode active material layer may be 3.0 g/cm³ or greater.

The thickness of the electrode active material layer of the electrode for a lithium ion secondary battery may be 40 μm or greater.

The electrode for a lithium ion secondary battery may be a positive electrode.

The electrode for a lithium ion secondary battery may be a negative electrode.

In addition, another aspect of the present invention relates to a lithium ion secondary battery including the electrode for a lithium ion secondary battery as described above, and an electrolyte solution.

The electrode for a lithium ion secondary battery according to the aspect of the present invention suppresses the formation of an oxide coating film on the surface of the current collector, improves the electron conductivity, and exhibits high permeability of the electrolyte solution. Therefore, even when an electrode including an electrode active material at a high packing density is prepared, a reduction in the diffusion of a lithium ion inside the electrode can be suppressed, and an increase in resistance can be suppressed.

Consequently, the volume energy density of a battery can be increased, and additionally a lithium ion secondary battery exhibiting suppression of a reduction in the output after repeated charge and discharge can be achieved.

In addition, since the electrode for a lithium ion secondary battery according to the aspect of the present invention permits high permeability of the electrolyte solution, a time period required for the permeation of the electrolyte solution into the inside of the electrode layer or for the impregnation of the inside of the electrode layer with the electrolyte solution can be reduced, and consequently the productivity can be improved.

In particular, when a high density electrode having a density of the electrode active material layer of 3.1 g/cm$^3$ or greater and a packing factor of the electrode active material of 60% or greater is prepared, the effect of the reduction of the time period required for impregnation is more significant. Therefore, the electrode for a lithium ion secondary battery according to the aspect of the present invention is very effective as an electrode for a large element such as BEV and PHEV which requires a high energy density.

Further, in lithium ion secondary batteries, a phenomenon in which an electrolyte solution is squeezed out during the expansion and contraction of the electrode associated with the charge and discharge, and uneven distribution of the liquid occurs, leading to lack of the electrolyte solution.

The lack of the electrolyte solution occurs especially in a portion where the current collector is adjacent to the electrode layer, resulting in undersupply of the electrolyte solution.

Moreover, repeated expansion and contraction of the electrode gives rise to a phenomenon of the disruption of the electron conduction path.

Consequently, it is difficult to maintain battery performance at a sufficient level, and to attain long-life and stable battery performance.

However, in the electrode for a lithium ion secondary battery according to the aspect of the present invention, since the electroconductive layer containing the solid electrolyte particles and the electroconductive particles is disposed in the vicinity of a site where the lack of the electrolyte solution and hence the lack of the lithium ion tend to occur, the permeability and retention of the electrolyte solution can be improved and a path for lithium supply by the solid electrolyte can be secured.

Moreover, the disposition of the electroconductive layer improves the electric conductivity.

Consequently, the lack of lithium can be prevented, and the capacity degradation during the charge-discharge cycle can be suppressed, leading to further improvement of the charge and discharge characteristics and the cycle life.

Moreover, conventionally, when rolling is repeatedly performed during the preparation of an electrode to increase the packing density of an active material, a pressure is applied on the interface between a current collector and an electrode layer, and the surface of the current collector is smoothed leading to a reduction in roughness.

Consequently, the following problem occurs: that is, the adhesion strength between a current collecting foil and the electrode layer is decreased and peeling therebetween occurs, and cell resistance increases during durability test of the battery.

However, in the electrode for a lithium ion secondary battery according to the aspect of the present invention, when an intense pressure is applied thereto, the electroconductive layer containing the solid electrolyte particles and the electroconductive particles, which is disposed between the current collector and the electrode active material layer, is deformed while maintaining an electrical contact point between the electroconductive particles contained in the electroconductive layer and the electrode active material. Consequently, the roughness of the surface of the current collector is not lost, and the anchoring effect exerted by the current collector can be maintained.

In other words, since the electrode for a lithium ion secondary battery according to the aspect of the present invention can prevent the peeling of the current collector and the electrode layer and maintain the electrical contact therebetween, an increase in resistance can be suppressed, and high output can be maintained even when rolling is repeated to improve the packing factor of the electrode active material.

DETAILED DESCRIPTION OF THE INVENTION

Hereinafter, embodiments of the present invention will be explained.

It is to be noted that the present invention is not limited to the following embodiments.

Electrode for Lithium Ion Secondary Battery

The electrode for a lithium ion secondary battery according to an embodiment of the present invention includes a current collector, and an electrode active material layer containing an electrode active material, the electrode active material layer being formed on at least one side of the current collector, in which the electrode includes an electroconductive layer containing solid electrolyte particles and electroconductive particles, between the current collector and the electrode active material layer.

The electrode for a lithium ion secondary battery according to the embodiment of the present invention may be a positive electrode for a lithium ion secondary battery or a negative electrode for a lithium ion secondary battery. Whether the positive electrode or the negative electrode, the effects of the invention can be achieved by the application of the configuration of the embodiment of the present invention.

Moreover, the components of the electrode for a lithium ion secondary battery according to the embodiment of the present invention are not particularly limited.

Although the current collector, the electrode active material layer and the electroconductive layer are essential components, the electrode according to the embodiment of the present invention may include a component other than those described above.

Examples of the other component include an optional layer, an electrolyte solution used for impregnation, and the like.

Current Collector

The current collector in the electrode for a lithium ion secondary battery according to the embodiment of the present invention is not particularly limited, and known current collectors for use in lithium ion secondary batteries may be used.

The material of the positive electrode current collector is exemplified by a metal material such as SUS, Ni, Cr, Au, Pt, Al, Fe, Ti, Zn, and Cu, and the like.

The material of the negative electrode current collector is exemplified by SUS, Ni, Cu, Ti, Al, baked carbon, an electroconductive polymer, electroconductive glass, an Al—Cd alloy, and the like.

Moreover, examples of the shape of the current collector include a foil-like shape, a plate-like shape, a mesh-like shape, and the like.

Also, the thickness of the current collector is not particularly limited, and is exemplified by 1 to 20 μm, but can be appropriately selected as needed.

Electrode Active Material Layer

In the electrode for a lithium ion secondary battery according to the embodiment of the present invention, the electrode active material layer containing the electrode active material as an essential component is required to be formed on at least one side of the current collector, and may be formed on both sides thereof.

The arrangement of the electrode active material layer can be appropriately selected depending on the type and structure of the intended lithium ion secondary battery.

Moreover, the electrode active material layer contains the electrode active material as an essential component, and may contain a known component such as an electroconductivity aid and a binder, as an optional component.

Electrode Active Material

In the electrode for a lithium ion secondary battery according to the embodiment of the present invention, the electrode active material contained in the electrode active material layer is not particularly limited as long as the electrode active material can occlude and release lithium ions, and substances known as an electrode active material of lithium ion secondary batteries can be used.

In the case where the electrode for a lithium ion secondary battery according to the embodiment of the present invention is a positive electrode for a lithium ion secondary battery, the positive electrode active material layer is exemplified by $LiCoO_2$, $LiCoO_4$, $LiMn_2O_4$, $LiNiO_2$, $LiFePO_4$, lithium sulfide, sulfur, and the like.

It is required to select, as the positive electrode active material, a material exhibiting a higher electric potential than the negative electrode from materials capable of constituting an electrode.

In the case where the electrode for a lithium ion secondary battery according to the embodiment of the present invention is a negative electrode for a lithium ion secondary battery, the negative electrode active material is exemplified by lithium metal, lithium alloys, metal oxides, metal sulfides, metal nitrides, silicon oxide, silicon, carbon materials such as graphite, and the like.

It is required to select, as the negative electrode active material, a material exhibiting a lower electric potential than the positive electrode from materials capable of constituting an electrode.

Density

The density of the electrode active material layer in the electrode for a lithium ion secondary battery according to the embodiment of the present invention is preferably 3.0 $g/cm^3$ or greater.

An electrode including the electrode active material layer having a density of 3.0 $g/cm^3$ or greater is produced under a high pressing pressure to attain the high density.

The pressing pressure which permits the density of the electrode active material layer of 3.0 $g/cm^3$ or greater provides a high adhesion strength between the electrode active material layer and the electroconductive layer, and favorable electric conductivity can be ensured even when swelling of the electrode active material layer and/or the electroconductive layer takes place upon the introduction of the electrolyte solution, etc.

Moreover, the electrode including the electrode active material layer having a density of 3.0 $g/cm^3$ or greater can give a battery with high energy density.

Therefore, such an electrode can be applied to an electrode for a large element such as BEV and PHEV which requires a high energy density.

Volumetric Packing Factor

In the electrode for a lithium ion secondary battery according to the embodiment of the present invention, the volumetric packing factor of the electrode active material is preferably 60% or greater with respect to the total volume of the electrode active material layer.

When the volumetric packing factor of the electrode active material is 60% or greater, an electrode for a lithium ion secondary battery having lower porosity can be obtained, and therefore an electrode having a greater volume energy density can be obtained.

The volumetric packing factor of the electrode active material of 60% or greater can provide a battery having a volume energy density as high as, for example, 500 Wh/L or greater.

Note that in the embodiment of the present invention, the volumetric packing factor of the electrode active material with respect to the total volume of the electrode active material layer constituting the electrode is more preferably 65% or greater, and most preferably 70% or greater.

Electroconductive Layer

The electroconductive layer in the electrode for a lithium ion secondary battery according to the embodiment of the present invention is disposed between the current collector and the electrode active material layer, and contains the solid electrolyte particles and the electroconductive particles.

Solid Electrolyte-Electroconductive Particle Complex

The solid electrolyte particles and the electroconductive particles are preferably complexed to form a solid electrolyte-electroconductive particle complex.

When the solid electrolyte particles and the electroconductive particles are present as a complex in the electroconductive layer, uniform distribution of the solid electrolyte particles and the electroconductive particles can be attained.

Moreover, in the solid electrolyte-electroconductive particle complex, it is preferable that the electroconductive particles are disposed on the surface of the solid electrolyte particles and the solid electrolyte particles are coated with the electroconductive particles.

When the electroconductive particles are disposed on the surface of the solid electrolyte particles, the electric conductivity of the electroconductive layer can be uniform.

A method for forming the solid electrolyte-electroconductive particle complex is not particularly limited, and examples thereof include a method in which the solid electrolyte particles and the electroconductive particles are dry mixed using a ball mill or the like.

Mass Ratio of Solid Electrolyte-Electroconductive Particle Complex

The mass ratio of the solid electrolyte-electroconductive particle complex in the electroconductive layer is desirably 50% to 95% with respect to the entire electroconductive layer. When the mass ratio of the solid electrolyte-electroconductive particle complex is less than 50%, the retention of the electrolyte solution may be deteriorated, and hence the capacity maintenance rate after the charge-discharge cycle may be reduced.

On the other hand, when the mass ratio is greater than 95%, the electroconductive particles may be incapable of maintaining electrical contact points during rolling in the formation of the electroconductive layer, and the electric conductivity may be deteriorated.

Solid Electrolyte Particles

In the electrode for a lithium ion secondary battery according to the embodiment of the present invention, the permeation effect of the electrolyte solution is considered to arise from the ferroelectric nature of the solid, and the solid electrolyte particles contained in the electroconductive layer are especially preferably particles of an oxide solid electrolyte.

The oxide solid electrolyte is inexpensive, and additionally, superior in electrochemical oxidation and reduction resistance.

Although the oxide solid electrolyte is not particularly limited, lithium-based oxides are preferable since they have small true specific gravity and are less likely to cause an increase in the mass of the electrode.

Examples of the lithium-based oxides include $Li_7La_3Zr_2O_{12}$ (LLZO), $Li_{6.75}La_3Zr_{1.75}Ta_{0.25}O_{12}$ (LLZTO), $Li_{0.33}La_{0.56}TiO_3$ (LLTO), $Li_{1.3}Al_{0.3}Ti_{1.7}(PO_4)_3$ (LATP), and $Li_{1.6}Al_{0.6}Ge_{1.4}(PO_4)_3$ (LAGP), and in the embodiment of the present invention, it is preferable to use at least one selected from the group consisting of the above-listed lithium-based oxides.

Particle Size of Solid Electrolyte Particles

The particle diameter of the solid electrolyte particles contained in the electroconductive layer is preferably smaller than the particle diameter of the electrode active material contained in the electrode active material layer, and greater than the particle diameter of the electroconductive particles contained in the electroconductive layer.

When the particle diameter of the solid electrolyte particles contained in the electroconductive layer is smaller than the particle diameter of the electrode active material contained in the electrode active material layer, battery characteristics other than the energy density of the battery can be improved without decreasing the energy density of the battery.

Moreover, when the particle diameter of the solid electrolyte particles contained in the electroconductive layer is greater than the particle diameter of the electroconductive particles contained in the electroconductive layer, the solid electrolyte particles can be uniformly distributed in the electroconductive layer, leading to an improvement of the permeability of the electrolyte solution.

In other words, when the particle diameter of the solid electrolyte particles is smaller than the particle diameter of the electrode active material and greater than the particle diameter of the electroconductive particles, the electrode for a lithium ion secondary battery according to the embodiment of the present invention can attain an improvement of the permeability of the electrolyte solution into the electrode without decreasing the energy density of the battery.

The particle size of the solid electrolyte particles is not particularly limited, but is preferably 0.02 μm or greater and 10 μm or less, which means the particle size of the solid electrolyte particles is smaller than the particle size of the active material.

When the particle size is excessively small, the particles tend to aggregate, which inhibits the electron conductivity and causes an increase in cell resistance.

On the other hand, when the particle size is excessively great, the volume of the battery is increased, which hinders an increase in energy density.

Electroconductive Particles

In the electrode for a lithium ion secondary battery according to the embodiment of the present invention, the electroconductive particles contained in the electroconductive layer is not particularly limited as long as they exhibit electroconductivity.

Known electroconductive particles for use in an electrode active material layer of lithium ion secondary batteries may be used.

Examples of the electroconductive particles include acetylene black, furnace black, Ketjen black, carbon nanotubes, and the like, and in the embodiment of the present invention, it is preferable to use at least one selected from the group consisting of the above-listed materials.

Particle Size of Electroconductive Particles

The particle size of the electroconductive particles is not particularly limited, but is preferably 5 nm or greater and less than 50 nm.

When the particle size is excessively small, the electron conductivity may be inhibited, leading to an increase in cell resistance.

On the other hand, when the particle size is excessively great, the volume of the electrode layer is increased and the volume of the battery is increased, leading to a decrease in volume energy density.

Thickness

The thickness of the electrode active material layer in the electrode for a lithium ion secondary battery according to the embodiment of the present invention is not particularly limited, but is preferably, for example, 40 μm or greater. When the thickness is 40 μm or greater and the volumetric packing factor of the electrode active material is 60% or greater, the resultant electrode for a lithium ion secondary battery tends to have a high density.

Moreover, the volume energy density of the battery cell to be produced can reach as high as 500 Wh/L or greater.

Method for Producing Electrode for Lithium Ion Secondary Battery

A method for producing the electrode for a lithium ion secondary battery according to the embodiment of the present invention is not particularly limited, and routine methods in the art may be employed.

For example, the following method is mentioned. The solid electrolyte particles and the electroconductive particles are dry mixed beforehand to form the solid electrolyte-electroconductive particle complex, and an electroconductive paste containing the solid electrolyte-electroconductive particle complex and a binder is applied to the current collector, followed by drying, to form the electroconductive layer.

Subsequently, an electrode paste containing the electrode active material as an essential component is applied to the electroconductive layer formed thus, and dried, followed by rolling, to obtain the electrode for a lithium ion secondary battery.

In the above method, the density of the electrode active material layer and the volumetric packing factor of the electrode active material can be regulated by changing the press pressure in the rolling.

For the method for applying the electroconductive paste to the current collector, known methods can be employed. Examples of the method for applying the electroconductive paste to the current collector include methods such as: coating with the help of a gravure roll; roller coating with the help of an applicator roll or the like; screen coating; blade coating; spin coating; bar coating; and the like.

Also, the method for applying the electrode paste to the electroconductive layer is not particularly limited.

For example, the method is exemplified by known methods such as: roller coating with the help of an applicator roll or the like; screen coating; blade coating; spin coating; bar coating; and the like.

Lithium Ion Secondary Battery

A lithium ion secondary battery according to another embodiment of the present invention includes the electrode for a lithium ion secondary battery according to the embodiment of the present invention, and an electrolyte solution.

Positive Electrode and Negative Electrode

In the lithium ion secondary battery according to the embodiment of the present invention, the positive electrode or the negative electrode, or both the positive electrode and the negative electrode are the electrode for a lithium ion secondary battery according to the embodiment of the present invention.

Note that when the positive electrode alone is the electrode for a lithium ion secondary battery according to the embodiment of the present invention, a metal, a carbon material and/or the like which serve as the negative electrode active material can be directly used in the form of a sheet as the negative electrode.

Electrolyte Solution

The electrolyte solution employed in the lithium ion secondary battery according to the embodiment of the present invention is not particularly limited, and known electrolyte solutions for use in an electrolyte solution of lithium ion secondary batteries may be used.

Solvent

Solvents for use in the preparation of common nonaqueous electrolyte solutions may be used as the solvent in the electrolyte solution.

Examples of the solvent include solvents having a cyclic structure such as ethylene carbonate (EC) and propylene carbonate (PC), and solvents having a chain structure alone such as dimethyl carbonate (DMC), ethyl methyl carbonate (EMC) and diethyl carbonate (DEC).

Moreover, partially fluorinated carbonates such as fluoroethylene carbonate (FEC) and difluoroethylene carbonate (DFEC) may be used.

Moreover, a known additive may be blended into the electrolyte solution, and examples of the additive include vinylene carbonate (VC), vinyl ethylene carbonate (VEC), propanesultone (PS), and the like.

Moreover, ionic liquids may be used as an electrolyte solution having a high concentration.

The ionic liquid is exemplified by pyrrolidinium, piperidinium, imidazolium and the like, which have a quaternary ammonium cation moiety.

Lithium Salt

In the lithium ion secondary battery according to the embodiment of the present invention, the lithium salt contained in the electrolyte solution is not particularly limited, and examples thereof include $LiPF_6$, $LiBF_4$, $LiClO_4$, $LiN(SO_7CF_3)$, $LiN(SO_2C_2F)_2$, $LiCF_3SO_3$, and the like.

Of these, $LiPF_6$, $LiBF_4$, or a mixture thereof is preferable since they have high ionic conductivity and high degree of dissociation.

Method for Producing Lithium Ion Secondary Battery

A method for producing the lithium ion secondary battery according to the embodiment of the present invention is not particularly limited, and routine methods in the art may be employed.

EXAMPLES

Next, the present invention will be described in more detail by way of Examples, but the present invention is not limited thereto.

Example 1

Preparation of Solid Electrolyte-Electroconductive Particle Complex $Li_{1.3}Al_{0.3}Ti_{1.7}P_3O_{12}$ (LATP) as solid electrolyte particles, and carbon black as electroconductive particles were provided, and were mixed at a mass ratio of LATP:carbon black=1:2 to give a mixture.

Note that LATP used had a median diameter (D50) of 0.4 μm, and bulk lithium ion conductivity of $5 \times 10^{-4}$ S/cm.

The carbon black had a DBP oil absorption (measured using dibutyl phthalate (DBP) in accordance with the method specified in JIS K6217-4 (2008)) of 160 ml/100 g, and a primary particle diameter of 35 nm.

Subsequently, the resultant mixture and zirconia balls having a diameter of 2 mm were charged into a milling pot, and kneaded at the number of revolutions of 1000 rpm for 1 hour using a planetary ball mill apparatus manufactured by Fritsch GmbH, to obtain a solid electrolyte-electroconductive particle complex.

The observation of the resultant solid electrolyte-electroconductive particle complex with an electron microscope revealed that the carbon black was disposed on the surface of LATP, and the coverage thereof was 34.

Preparation of Positive Electrode

Preparation of Electroconductive Layer

The solid electrolyte-electroconductive particle complex obtained above, polyvinylidene fluoride (PVDF) as a binder, and N-methyl-2-pyrrolidone (NMP) as a solvent were mixed at a mass ratio of 35:15:50, to prepare an electroconductive paste. In other words, the mass ratio of the solid electrolyte-electroconductive particle complex in the electroconductive layer with respect to the entire electroconductive layer after the removal of NMP serving as the solvent was 70%.

An aluminum foil having a thickness of 15 μm as a current collector was provided, the electroconductive paste was applied to the aluminum foil according to a gravure method with the help of a gravure roll (#200), and subsequently dried in air at 180° C. for 3 minutes, to form the electroconductive layer on the current collector.

The thickness of the electroconductive layer was 4 μm.

Preparation of Electrode Active Material Layer $LiNi_{0.6}Co_{0.2}Mn_{0.2}O_2$ (hereinafter, abbreviated as NCM622) as a positive electrode active material, the carbon black used above, and polyvinylidene fluoride (PVDF) as a binder at a mass ratio of 94:4:2 were mixed with N-methyl-2-pyrrolidone (NMP) as a dispersion solvent, to prepare a positive electrode paste.

Note that NCM622 used above had a median diameter of 12.4 μm.

Subsequently, the resultant positive electrode paste was applied to the electroconductive layer formed on the current collector, dried at 120° C. for 10 minutes, pressed several times with a roll press at a linear load of 1 t/cm, and thereafter dried in vacuo at 120° C., to form an electrode active material layer for serving as a positive electrode, to thereby give a positive electrode for a lithium ion secondary battery.

In the resultant positive electrode for a lithium ion secondary battery, the electrode active material layer had a thickness of 77 μm, a mass per unit area of 22.2 mg/cm², and a density of 2.9 g/cc.

Note that the positive electrode prepared above was used after die-cutting it to a size of 30 mm×40 mm.

Preparation of Negative Electrode

An aqueous solution of sodium carboxymethylcellulose (CMC) as a binder and acetylene black as an electroconductivity aid were blended, and preliminarily mixed using a planetary mixer. To the resultant mixture was blended natural graphite (NG, D50=12 μm) as a negative electrode active material, and the dispersion treatment was carried out again using the planetary mixer, to yield a mixture for a negative electrode composite. Subsequently, to the resultant mixture for a negative electrode composite was added styrene butadiene rubber (SBR) as a binder, to prepare a negative electrode paste.

A copper foil having a thickness of 8 μm as a current collector was provided. The negative electrode composite paste prepared above was applied to one side of the current collector, followed by drying at 100° C. for 10 minutes, then was pressed several times with a roll press at a linear load of 1 t/cm, and subsequently dried in vacuo at 120° C., to prepare a negative electrode for a lithium ion secondary battery.

Note that the negative electrode prepared thus was used after die-cutting it to a size of 34 mm×44 mm.

Preparation of Lithium Ion Secondary Battery

A nonwoven fabric having a three-layer laminate structure of polypropylene/polyethylene/polypropylene (thickness: 20 μm) as a separator was provided.

A laminate of the positive electrode, the separator and the negative electrode prepared above was inserted into a pouch prepared by heat-sealing an aluminum laminate for secondary batteries (manufactured by Dai Nippon Printing Co., Ltd.). A solution prepared by dissolving LiPF6 in a solvent mixture of ethylene carbonate, diethyl carbonate and ethyl methyl carbonate in a volume ratio of 30:40:30 at 1.2 mol/L was used as an electrolyte solution, and thus a lithium ion secondary battery was prepared.

Examples 2 to 3

A lithium ion secondary battery was prepared in a similar manner to Example 1 except that the density of the electrode active material layer in the positive electrode was changed as specified in Table 1.

Note that the density of the electrode active material layer can be controlled by changing a linear load of the roll press.

Comparative Examples 1 to 2

A lithium ion secondary battery was prepared in a similar manner to Example 1 except that the electroconductive layer was not provided on the positive electrode and the density of the electrode active material layer was changed as specified in Table 1.

Evaluation

The following evaluations were made on the electrode for a lithium ion secondary battery and the lithium ion secondary battery which were obtained in Examples and Comparative Examples.

Permeation Time

A test sample was prepared by die-cutting the resultant electrode for a lithium ion secondary battery to a size of 16 mm φ.

The test sample was dried in vacuo for 11 hours, and then the test sample was left to settle horizontally in a glove box in an argon atmosphere with the electrode active material layer turned up.

Subsequently, 5 μL of a propylene carbonate solvent was dropped from a height of 1 cm above the electrode active material layer, and the time period required for the solvent to completely disappear on the surface of the electrode active material layer was measured.

A total of three measurements were carried out, and the average thereof was designated as a permeation time.

Peeling Test

A test sample was prepared by die-cutting the resultant electrode for a lithium ion secondary battery to a size of 30 mm length×10 mm width.

The test sample was dried in vacuo for 11 hours and then inserted into a vial bottle containing a sufficient amount of the electrolyte solution, and the vial bottle was left to stand for 12 hours in a thermostated bath set to 75° C. After being left to stand for 72 hours, the test sample was observed and visually inspected on the presence or absence of the peeling of the electrode.

Note that when at least a part of the electrode active material layer was peeled and a fragment of the active material layer was found on the bottom of the vial bottle, the determination of the presence of the peeling was made.

Initial Discharge Capacity, Discharge Capacity after Durability Test, Capacity Maintenance Rate Initial Discharge Capacity The lithium ion secondary battery prepared above was left to stand at a measurement temperature (25° C.) for 1 hour, then was subjected to constant current charge at 0.2 C to 4.2 V and subsequently to constant voltage charge at 4.2 V for 1 hour, then was left to stand for 1 hour. Discharge was permitted at a discharge rate of 0.2 C to 2.5 V, and an initial discharge capacity was measured.

The results are shown in Table 1.

Discharge Capacity after Durability Test

As a charge-discharge cycle durability test, one cycle was defined as an operation of constant current charge at 1 C to 4.2 V, and subsequent constant current discharge at a discharge rate of 2 C to 2.5 V in a thermostated bath at 45° C., and this operation was repeated 500 times.

After the completion of the 500 cycles, the thermostated bath was set to 25° C., and the lithium ion secondary battery was left to stand for 24 hours as it was after the 2.5 V discharge, and subsequently, the discharge capacity after durability test was measured in a similar manner to the measurement of the initial discharge capacity.

The results are shown in Table 1.

Capacity Maintenance Rate

The discharge capacity after durability test with respect to the initial discharge capacity was determined, and designated as the capacity maintenance rate.

The results are shown in Table 1.

Initial Cell Resistance, Cell Resistance after Durability Test, Rate of Increase of Cell Resistance Initial Cell Resistance The lithium ion secondary battery prepared above was left to stand at a measurement temperature (25° C.) for 1 hour, to adjust the state of charge (SOC) to 50%.

Next, the lithium ion secondary battery was subjected to pulse discharge at a C rate of 0.2 C for 10 seconds, and the voltage at the time of the completion of the 10 seconds discharge was measured.

Then, the voltage at the time of the completion of the 10 seconds discharge was plotted with respect to the current at 0.2 C, with the horizontal axis being the current value, and the vertical axis being the voltage.

Next, after being left to stand for 5 minutes, the lithium ion secondary battery was subjected to auxiliary charge to reset the SOC to 50%, and further left to stand for 5 minutes.

Next, the operation described above was carried out at C rates of 0.5 C, 1 C, 1.5 C, 2 C, 2.5 C and 3 C, and the voltage at the time of the completion of the 10 seconds discharge was plotted with respect to the current for each C rate.

Then, the slope of the approximation straight line obtained from each plot was designated as the internal resistance of the lithium ion secondary battery in the present Example. The results are shown in Table 1.

Cell Resistance after Durability Test

The lithium ion secondary battery after the measurement of the discharge capacity after durability test was adjusted so as to have a state of charge (SOC) of 50%, and the cell resistance after durability test was determined in accordance with a similar method to the measurement of the initial cell resistance.

The results are shown in Table 1.

Rate of Increase of Cell Resistance

The cell resistance after durability test with respect to the initial cell resistance was determined, and this was designated as a rate of increase of cell resistance. The results are shown in Table 1.

TABLE 1

|  | Example1 | Example2 | Example3 | Comparative Example1 | Comparative Example2 |
|---|---|---|---|---|---|
| Disposition of electroconductive layer | Positive electrode | Positive electrode | Positive electrode | — | — |
| Thickness of electroconductive layer (μm) | 4 | 4 | 5 |  |  |
| Type of solid electrolyte particles | LATP | LATP | LPO | — | — |
| Particle diameter of solid electrolyte particles (μm) | 0.4 | 0.4 | 0.4 | — | — |
| Type of electroconductive particles | CB | CB | CB | — | — |
| Particle diameter of electroconductive particles (nm) | 35 | 35 | 35 | — | — |

TABLE 1-continued

| | Example1 | Example2 | Example3 | Comparative Example1 | Comparative Example2 |
|---|---|---|---|---|---|
| Type of electrode active material | NCM622 | NCM622 | NCM622 | NCM622 | NCM622 |
| Particle diameter of electrode active material (μm) | 12.4 | 12.4 | 12.4 | 12.4 | 12.4 |
| Density of electrode active material layer (g/cm$^3$) | 2.9 | 3.3 | 3.5 | 3.3 | 3.5 |
| Permeation time (min) | 9 | 130 | 217 | 159 | 249 |
| Presence of peeling | No | No | Yes | Yes | Yes |
| Initial discharge capacity (mAh) | 41.7 | 42.0 | 41.2 | 41.7 | 42.3 |
| Discharge capacity after durability test (mAh) | 37.5 | 37.6 | 36.7 | 35.8 | 36.0 |
| Capacity maintenance rate (%) | 89.9 | 89.5 | 89.1 | 85.9 | 85.1 |
| Initial cell resistance (mΩ) | 718 | 703 | 752 | 746 | 720 |
| Cell resistance after durability test (Ω) | 1012 | 986 | 1076 | 1124 | 1207 |
| Rate of increase of cell resistance (%) | 140.9 | 140.3 | 143.1 | 150.7 | 167.6 |

What is claimed is:

1. An electrode for a lithium ion secondary battery, comprising a current collector, and an electrode active material layer comprising an electrode active material particle, the electrode active material layer being formed on at least one side of the current collector,
wherein the electrode comprises an electroconductive layer comprising solid electrolyte particles and electroconductive particles, between the current collector and the electrode active material layer,
wherein a particle diameter of the solid electrolyte particles is smaller than a particle diameter of the electrode active material particle, and greater than a particle diameter of the electroconductive particles, and
wherein the electroconductive layer is formed by a solid electrolyte-electroconductive particle complex in which the electroconductive particles are disposed on a surface of the solid electrolyte particles.

2. The electrode for a lithium ion secondary battery according to claim 1, wherein the solid electrolyte particles are particles of an oxide solid electrolyte.

3. The electrode for a lithium on secondary battery according to claim 2, wherein the oxide solid electrolyte is at least one selected from the group consisting of $Li_7La_3Zr_2O_{12}$(LLZO), $Li_{6.75}La_3Zr_{1.75}Ta_{0.25}O_{12}$(LLZTO), $Li_{0.33}La_{0.56}TiO_3$(LLTO), $Li_{1.3}Al_{0.3}Ti_{1.7}(PO_4)_3$(LATP), and $Li_{1.6}Al_{0.6}Ge_{1.4}(PO_4)_3$(LAGP).

4. The electrode for a lithium ion secondary battery according to claim 1, wherein a density of the electrode active material layer is 3.0 g/cm$^3$ or greater.

5. The electrode for a lithium ion secondary battery according to claim 1, wherein a thickness of the electrode active material layer of the electrode for a lithium ion secondary battery is 40 μm or greater.

6. The electrode for a lithium ion secondary battery according to claim 1, wherein the electrode for a lithium ion secondary battery is a positive electrode.

7. The electrode for a lithium ion secondary battery according to claim 1, wherein the electrode for a lithium ion secondary battery is a negative electrode.

8. A lithium ion secondary battery comprising the electrode for a lithium ion secondary battery according to claim 1, and an electrolyte solution, wherein the electrolyte solution comprises fluoride as a lithium salt.

* * * * *